(Specimens.)

J. S. ROBERTS.
PROCESS OF ORNAMENTING GLASS SURFACES.

No. 334,472. Patented Jan. 19, 1886.

Attest.
E. N. Adams
A. S. Smith

Inventor.
John S. Roberts,
pr R. F. Osgood,
Atty.

United States Patent Office.

JOHN S. ROBERTS, OF ROCHESTER, NEW YORK, ASSIGNOR TO THE STEIN MANUFACTURING COMPANY, OF SAME PLACE.

PROCESS OF ORNAMENTING GLASS SURFACES.

SPECIFICATION forming part of Letters Patent No. 334,472, dated January 19, 1886.

Application filed September 28, 1885. Serial No. 178,319. (Specimens.)

*To all whom it may concern:*

Be it known that I, JOHN S. ROBERTS, of the city of Rochester, in the county of Monroe and State of New York, have invented a certain new and Improved Process of Ornamenting Glass Surfaces; and I do hereby declare that the following is a full, clear, and exact description of the same, reference being had to the drawings accompanying this application, in which—

Figure 1:
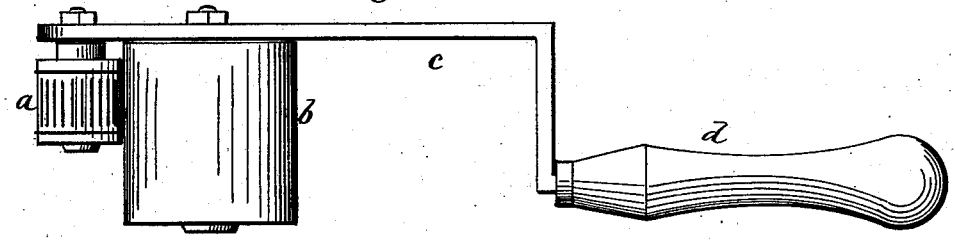
Figure 2:
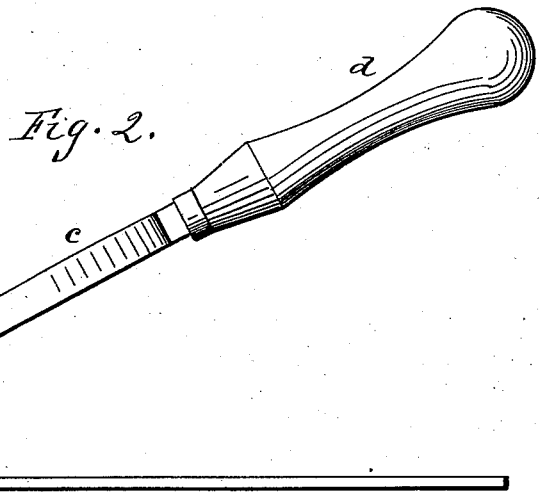
Figure 3:
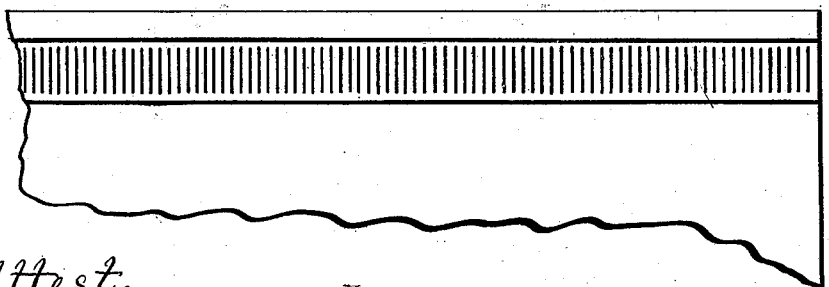

Figure 1 is a perspective view of the tool to be used; Fig. 2, a side view of the same, and Fig. 3 a plan view of the sheet of glass as operated upon.

My improvement consists of a process of forming designs on glass surfaces in imitation of designs produced by grinding, sand-blasting, etching, &c. Such designs, as ordinarily produced, are expensive and require much time and labor to produce them.

My invention consists in providing a rubber roller on which the design is marked, coating the same with varnish, then passing the roller over the surface to be ornamented, so as to transfer the impression thereon, and finally sprinkling or sifting finely-pulverized soapstone or similar material over the impress, which, by adhering thereto, produces the design, all as hereinafter described.

In carrying out my invention I employ an instrument similar to that shown in Figs. 1 and 2, in which *a* is a rubber roller, on the surface of which is formed any design it is desired to produce on the glass.

*b* is a feeding-roller, which rolls in contact with the rubber roller and transfers the varnish thereto.

*c* is a frame to which the parts are attached, and *d* is a handle by which the instrument is operated.

In use the large roller *b* is rolled over a slab with varnish spread thereon, and it takes up the varnish and transmits it to the rubber roller. As the rubber roller is rolled over the surface of the glass it produces the impression thereon in varnish. After this is done, finely-pulverized soapstone or some equivalent material is sprinkled over the impression, and, adhering to the varnish, it produces the appearance of ground or sand-blasted glass, the imitation being very perfect.

By the use of this invention much labor, cost, and time are saved, and it is of especial value in those cases where but little wear or exposure comes on the glass, and in other cases where the long endurance of the design is not a matter of consequence.

It is applicable in many places where grinding and sand-blasting cannot be conveniently done.

A similar effect might be produced by using a print instead of a roller; but it would not be so effective, as the impression would have to be put on in sections, and in some places it could not be used.

Having described my invention, what I claim as new, and desire to secure by Letters Patent, is—

The process herein described of producing imitations of ground and sand-blast designs on glass, which consists in first passing a rubber roller provided with the design and coated with varnish over the glass, and then sprinkling or sifting pulverized soapstone or similar material over the impression, as set forth.

In witness whereof I have hereunto signed my name in the presence of two subscribing witnesses.

JOHN S. ROBERTS.

Witnesses:
E. STARING,
R. F. OSGOOD.